United States Patent
Suzuki

(12) 
(10) Patent No.: US 6,289,096 B1
(45) Date of Patent: *Sep. 11, 2001

(54) CALL ROUTING METHOD USING PRIORITIZED SOURCE-DESTINATION ROUTES

(75) Inventor: Minoru Suzuki, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,340

(22) Filed: Jun. 17, 1998

(30) Foreign Application Priority Data

Jun. 18, 1997 (JP) .................................. 9-160716

(51) Int. Cl.⁷ .................................................. H04M 7/00
(52) U.S. Cl. .......................................... 379/221; 379/114
(58) Field of Search .................................. 379/221, 220, 379/219, 229, 230, 114, 115

(56) References Cited

U.S. PATENT DOCUMENTS

| | | | |
|---|---|---|---|
| 5,289,536 | * 2/1994 | Hokari | 379/221 |
| 5,317,566 | * 5/1994 | Joshi | 370/60 |
| 5,337,352 | * 8/1994 | Kobayashi et al. | 379/234 |
| 5,425,085 | * 6/1995 | Weinberger et al. | 379/112 |
| 5,452,351 | * 9/1995 | Yamamoto | 379/221 |
| 5,715,304 | * 2/1998 | Nishida et al. | 379/114 |
| 5,764,741 | * 6/1998 | Barak | 379/114 |
| 5,799,072 | * 8/1998 | Vulcan et al. | 379/114 |
| 5,862,203 | * 1/1999 | Wulkan et al. | 379/114 |
| 6,023,501 | * 2/2000 | Wakamatsu | 379/114 |
| 6,044,075 | * 3/2000 | Le Boudec et al. | 370/351 |
| 6,061,437 | * 5/2000 | Yoon | 379/156 |
| 6,078,652 | * 6/2000 | Barak | 379/115 |

FOREIGN PATENT DOCUMENTS

| | | |
|---|---|---|
| 2-22948 | 1/1990 | (JP) . |
| 10-98477 | 4/1998 | (JP) . |

OTHER PUBLICATIONS

Lee, W., "Topology Aggregation for Hierarchical Routing in ATM Networks", ACM SIGCOMM, pp. 82–92, Computer Communication Review.

Japanese Office Action dated Mar. 2, 1999, with partial translation.

* cited by examiner

*Primary Examiner*—Ahmad Matar
*Assistant Examiner*—Benny Q. Tieu
(74) *Attorney, Agent, or Firm*—McGinn & Gibb, PLLC

(57) ABSTRACT

In a communication network in which nodes are interconnected by links, all possible routes between a source node and a destination node are determined such that each of the routes is formed of at least one of the links. A total cost of each of the routes is determined by summing the costs of the links of each route. The total costs of the routes are then modified according to priority of these routes and the modified total costs are stored into a memory. In response to a connection request from a user terminal, the memory is searched and a least cost route is selected. A connection request is then sent from the source node along the selected route. If a connection is not established by the connection request, a search is made again through the memory for selecting a least cost route by excluding the route previously selected and a connection request is sent again from the source node along the selected route.

4 Claims, 2 Drawing Sheets

FIG. 1
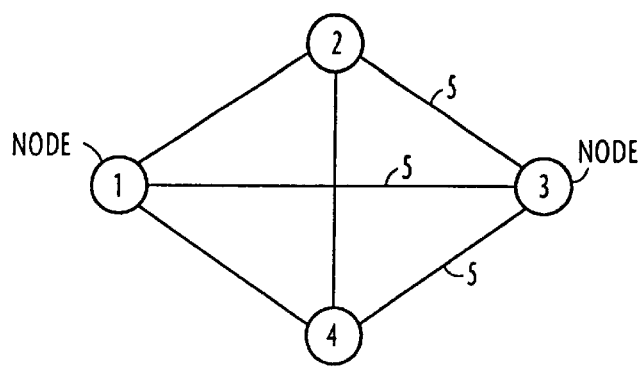
FIG. 2
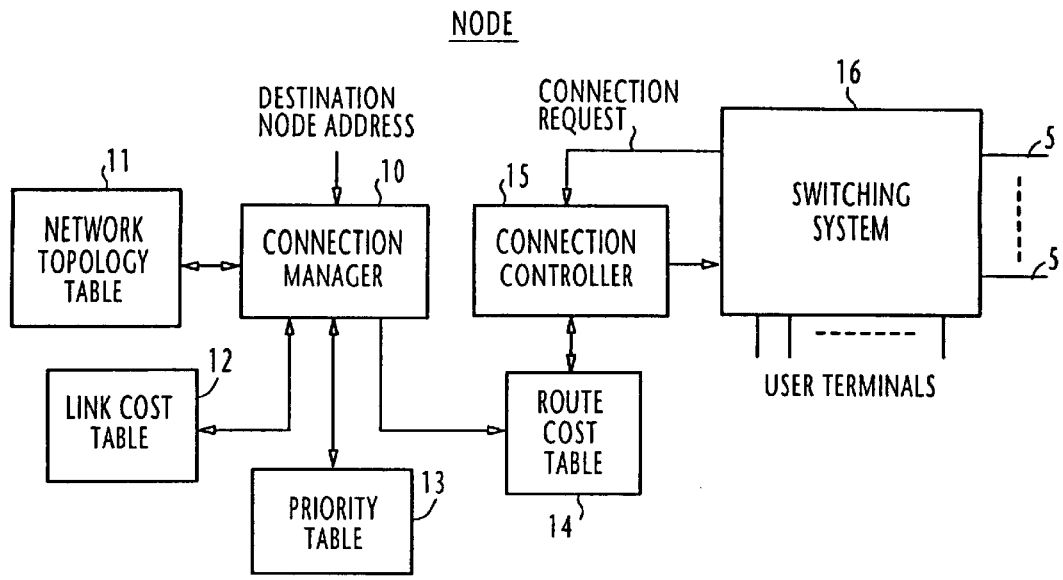
FIG. 4
CONNECTIONS BETWEEN NODES 1 AND 3
| ROUTE | ADDEND | MODIFIED COST |
|---|---|---|
| 1 - 3 | 0 | 1 |
| 1 - 2 - 3 | 0 | 2 |
| 1 - 4 - 3 | +1 | 3 |
| 1 - 2 - 4 - 3 | +1 | 4 |
| 1 - 4 - 2 - 3 | +2 | 5 |

CONNECTION MANAGER

CONNECTION CONTROLLER

CALL ROUTING METHOD USING PRIORITIZED SOURCE-DESTINATION ROUTES

BACKGROUND OF THE INVENTION

1. Field of the Invention

The present invention relates to least cost routing of a call across a communication network.

2. Description of the Related Art

In a communication network where nodes are interconnected by a link, the conventional least cost routing algorithm determines a total value of link costs for each of possible routes between source and destination nodes for comparison with each other to find a least cost route. However, since the link cost is usually represented by economic factors, the least cost route is not always the best route from the view point of network traffic or other requirements. If a failure occurs in a link, a need arises to avoid the failed link. However, the conventional route cost determination on a link-by-link basis would result in the selection of a route which is not optimum for network traffic.

SUMMARY OF THE INVENTION

It is therefore an object of the present invention to provide a method and a network node for selecting a route in a communication network that is optimum for the network.

According to a first aspect of the present invention, there is provided a method of routing a call in a communication network formed of a plurality of nodes interconnected by links, comprising determining all possible routes between a source node and a destination node in the network, each of the routes being formed of at least one of the links, determining a total cost of each of the routes by summing costs of the links of each route, and modifying the total costs of the routes according to priority of the routes and storing the modified total costs into a memory. Responsive to a connection request, the memory is searched to select a least cost route and a connection request is sent from the source node along the selected route. If a connection is not established by the connection request, a search is made again through the memory for selecting a least cost route by excluding one or more routes previously selected and a connection request is sent again from the source node along the selected route.

According to a second aspect, the present invention provides a network node for a communication network, comprising a memory and a first controller for determining all possible routes between the network node and a destination node, each of the routes being formed of at least one communication link determining a total cost of each of the routes by summing costs of the links of each route, and modifying the total costs of the routes according to priority of the routes and storing the modified total costs into the memory. A second controller is responsive to a connection request for making a search through the memory for selecting a least cost route, sending a connection request along the selected route, and repeating the search through the memory for selecting a next least cost route if a connection is not established by the connection request by excluding one or more routes previously selected.

BRIEF DESCRIPTION OF THE DRAWINGS

The present invention will be described in further detail with reference to the accompanying drawings, in which:

FIG. 1 is a schematic block diagram of a simplified communication network;

FIG. 2 is a block diagram of a node of the network in FIG. 1;

FIG. 4 is an illustration of possible routes between source and destination nodes and their corresponding addend values and modified route costs.

DETAILED DESCRIPTION

Figure 3:
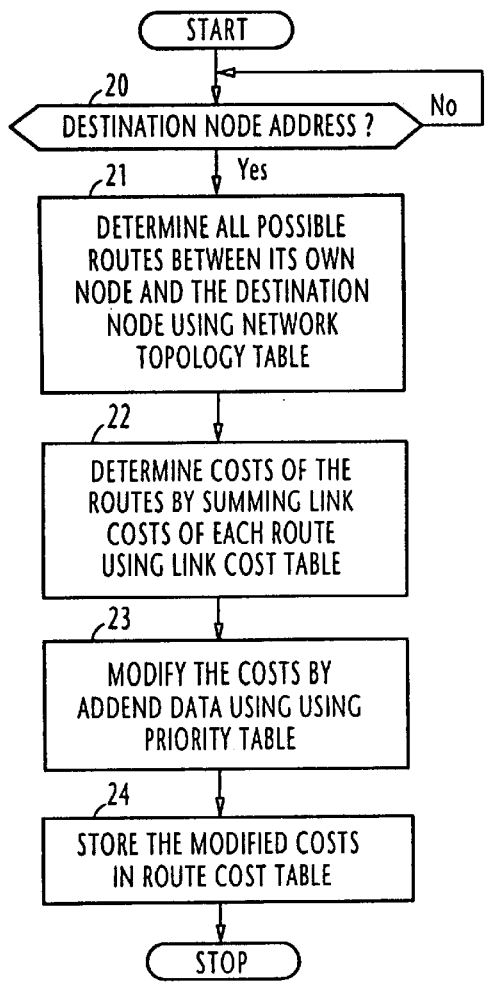
FIG. 3 is a flowchart of the operation of a connection manager.

For the purpose of disclosure, a simplified communication network is shown in FIG. 1 as comprising a plurality of network nodes 1 to 4 interconnected by communication links 5.

As illustrated in FIG. 2, each network node comprises a connection manager 10, a connection controller 15 and a switching system 16 to which communication links 5 and user terminals are connected. Connection manager 10 is associated with a network topology table 11, a link cost table 12, a priority table 13 and a route cost table 14. Connection controller 15 is responsive to a connection request supplied from a user terminal via the switching system 16 for looking up the route cost table 14 to establish a connection.

Connection manager 10 operates according to the flowchart of FIG. 3. At step 20, the connection manager receives a destination node address identifying a destination node of the network and proceeds to step 21 to look up the network topology table 11 to determine all possible routes between its own (source) node and the destination node. At step 22, the connection manager 10 determines a cost of each of the determined routes by summing the costs of the links of each route using data stored in the link cost table 12. At step 23, each route cost is modified by addend data stored in the priority table 13 by summing a ± addend data to each route cost. As shown in FIG. 4, if the source and destination nodes are nodes 1 and 3, there is a total of five possible routes over which connections can be established.

Assume that each communication link has a link cost "1", and the addend data stored in the priority table 13 are as indicated in FIG. 4, the modified costs of the routes 1-3, 1-2-3, 1-2-4-3, and 1-4-4 2-3 are "1", "2", "3", "4"and "5", respectively. The values of the addends are determined to give routes to be selected according to priority. During normal operation, the usual practice is to select a direct route between source and destination nodes. When a failure occurs in a link, a transit route is selected from among a plurality of alternate routes according to priority. If priority selection is not necessary for a set of alternate routes, the addend values for these routes are so determined that their modified route costs are equal to each other. For example, if the routes 1-2-4-3 and 1-4-2-3 are of equal priority, their addend values are set equal to "+1".

The modified route cost data obtained in this way are stored into the route cost table 14 (step 24) and the connection manager 10 terminates the routine.

Figure 5:
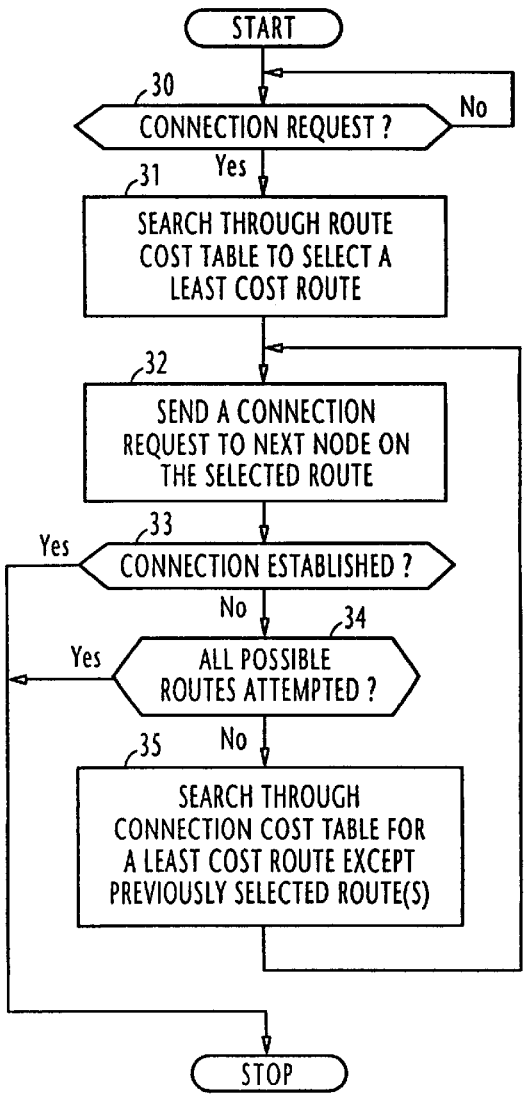
FIG. 5 is a flowchart of the operation of a connection controller.

The operation of the connection controller 15 proceeds according to the flowchart of FIG. 5. When the connection controller 15 receives a connection request from the switching system 16 (step 30), it proceeds to step 31 to make a search through the route cost table 14 for a least cost route to the node identified by a destination address contained in the request. At step 32, a connection request is sent to the neighboring node on the selected route and the connection controller 15 waits for a packet returning from the destination node, indicating that a connection has been successfully established. If the connection controller 15 receives the returning packet, it terminates the routine. If it fails to receive such an acknowledgment packet within a predetermined time-out period, the connection controller 15 determines that the connection attempt has failed (step 33) and proceeds to step 34 to check to see if connection attempts have been made on all possible routes to the destination. If so, it proceeds to the end of the routine. Otherwise, the connection controller 15 proceeds to step 35 to make a search through the route cost table 14 again for a least cost route. This time it excludes the previously attempted route or routes from the list of possible routes. Flow returns from step 35 to step 32 to transmit a connection request to a neighboring node on the selected route and a determination is made at step 33 on whether the attempt is successful or not. If the attempt is not successful, flow proceeds to step 34 to repeat the same process. If the attempt is successful, flow proceeds from step 33 to the end of the routine.

Therefore, if there is a call from the node 1 to the node 3, the direct route 1-3 is the highest priority and normally selected. If the route 1-3 becomes faulty, the first connection attempt by the connection controller 15 would result in a failure, and a resultant second attempt will select the transit route 1-2-3 as a least cost route.

What is claimed is:

1. A method of routing a call in a communication network formed of a plurality of nodes interconnected by links comprising:

determining all possible routes between a source node and a destination node in said network, each of said routes being formed of at least one of said links;

determining a total cost of each of said routes by summing economic costs of the links of each route and storing in a memory at said source node;

modifying said stored total costs of said routes according to a priority of the routes based on non-economic factors and storing the modified total costs into said memory at said source node;

responsive to a connection request from said source node, making a search through said memory for selecting a least cost route;

sending a connection request from said source node along the selected route, thereby attempting to connect to said selected route; and if a connection is not established by the connection attempt within a predetermined period of time, repeating the process of making a search through said memory for selecting a sequentially next least cost route by excluding one or more routes previously selected, sending a new connection request from said source node along the newly selected route, and awaiting said predetermined period of time to determine if a connection has been established by said new connection, so that said process to attempt establishing a connection is repeated until a connection is established or until all possible routes in said memory have been sequentially attempted.

2. The method of claim 1, wherein said modifying of said total costs further comprises adding to or subtracting from said total costs based on values stored in a table.

3. A network node controller for a communications network, comprising:

a memory;

a first controller for determining all possible routes between the network node and a destination node, each of said routes being formed of at least one communication link, determining a total cost of each of said routes by summing economic costs of the links of each route, and modifying the total costs of said routes according to a priority of the routes based on non-economic factors and storing the modified total costs into said memory of said network node; and a second controller, responsive to a connection request, for making a search through said memory for selecting a least cost route, sending a connection request along the selected route, thereby attempting to make selected route connection, and repeating the search through said memory for selecting a next least cost route if said connection is not established by the connection attempt within a predetermined time period by excluding one or more routes previously selected, and continuing to repeat the process of waiting said predetermined time period to determine whether a connection has been established and, if no connection has been established, repeating said search through said memory to select a sequentially next least cost route by excluding one or more routes previously selected and sending a new connection request, so that said process is repeated until a connection is established or until all possible routes in said memory have been attempted.

4. The controller of claim 2, wherein said modifying of said total costs further comprises adding to or subtracting from said total costs based on values stored in a table.

* * * * *